US012394314B2

(12) United States Patent
Ogata et al.

(10) Patent No.: US 12,394,314 B2
(45) Date of Patent: Aug. 19, 2025

(54) PARKING MANAGEMENT APPARATUS, PARKING MANAGEMENT SYSTEM, PARKING MANAGEMENT METHOD AND NON-TRANSITORY COMPUTER READABLE MEDIUM

(71) Applicant: NEC Corporation, Tokyo (JP)

(72) Inventors: Kazuki Ogata, Tokyo (JP); Tetsuro Hasegawa, Tokyo (JP); Hiroaki Aminaka, Tokyo (JP); Kosei Kobayashi, Tokyo (JP); Kei Yanagisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 18/283,039

(22) PCT Filed: Mar. 24, 2021

(86) PCT No.: PCT/JP2021/012236
§ 371 (c)(1),
(2) Date: Sep. 20, 2023

(87) PCT Pub. No.: WO2022/201358
PCT Pub. Date: Sep. 29, 2022

(65) Prior Publication Data
US 2024/0169840 A1    May 23, 2024

(51) Int. Cl.
*G07B 15/02* (2011.01)
*G06V 20/52* (2022.01)
(Continued)

(52) U.S. Cl.
CPC ............. *G08G 1/148* (2013.01); *G06V 20/52* (2022.01); *G08G 1/0116* (2013.01);
(Continued)

(58) Field of Classification Search
None
See application file for complete search history.

(56) References Cited

U.S. PATENT DOCUMENTS

| 5,504,314 A * | 4/1996 | Farmont | G08G 1/14 |
| | | | 194/902 |
| 2006/0129500 A1 * | 6/2006 | Mandy | G06Q 20/367 |
| | | | 705/65 |

(Continued)

FOREIGN PATENT DOCUMENTS

| JP | H06-052495 A | 2/1994 |
| JP | 2005-258842 A | 9/2005 |

(Continued)

OTHER PUBLICATIONS

International Search Report for PCT Application No. PCT/JP2021/012236, mailed on Jun. 1, 2021.

*Primary Examiner* — John F Mortell
(74) *Attorney, Agent, or Firm* — Sughrue Mion, PLLC

(57) ABSTRACT

An object of the present disclosure is to provide a parking management apparatus and the like each adapted to control traffic congestion near parking lots and perform management of parking lots more efficiently. A parking management apparatus includes a parking-lot-inside-state measurement unit configured to measure a congestion state inside a parking lot, a determining unit configured to determine, based on the measured congestion state inside the parking lot, a location of issuance of an electronic numbered ticket for the parking lot, and an issuing unit configured to issue the electronic numbered ticket when the vehicle reaches a location in a neighborhood of the location that has been determined by the determining unit.

18 Claims, 7 Drawing Sheets

(51) Int. Cl.
*G08G 1/01* (2006.01)
*G08G 1/14* (2006.01)
*H04W 4/029* (2018.01)

(52) U.S. Cl.
CPC ......... *G08G 1/0133* (2013.01); *G08G 1/0141* (2013.01); *G08G 1/144* (2013.01); *G08G 1/146* (2013.01); *H04W 4/029* (2018.02); *G06V 2201/08* (2022.01)

(56) References Cited

U.S. PATENT DOCUMENTS

| | | | |
|---|---|---|---|
| 2019/0392543 A1* | 12/2019 | Bautista | H04W 12/03 |
| 2020/0031395 A1* | 1/2020 | Matsunaga | B62D 15/0285 |
| 2020/0143683 A1* | 5/2020 | Maruiwa | G08G 1/149 |
| 2020/0258318 A1* | 8/2020 | Endo | G08G 1/144 |
| 2020/0282977 A1* | 9/2020 | Hara | B62D 15/0285 |

FOREIGN PATENT DOCUMENTS

| | | |
|---|---|---|
| JP | 2009-014536 A | 1/2009 |
| JP | 2014-206857 A | 10/2014 |
| JP | 2017-062692 A | 3/2017 |
| JP | 2018-106375 A | 7/2018 |
| WO | 2014/040612 A1 | 3/2014 |

\* cited by examiner

PARKING MANAGEMENT APPARATUS, PARKING MANAGEMENT SYSTEM, PARKING MANAGEMENT METHOD AND NON-TRANSITORY COMPUTER READABLE MEDIUM This application is a National Stage Entry of PCT/JP2021/012236 filed on Mar. 24, 2021, the contents of all of which are incorporated herein by reference, in their entirety.

TECHNICAL FIELD

The present disclosure relates to a parking management apparatus, a parking management system, a parking management method, and a program.

BACKGROUND ART

Patent Literature 1 discloses a parking lot management system for preventing traffic congestion in the downtown area or the tourist attraction areas, in which peripheral parking lots located in the vicinity of the downtown area or in the vicinity of the tourist attraction areas are equipped with a numbered ticket issuing machine for issuing numbered tickets on which the selection conditions for selecting a desired parking lot and a reference number of the desired parking lot are recorded. According to the disclosure of Literature 1, since the vehicle parking fee apply from the instant a vehicle leaves a peripheral parking lot until the vehicle is parked in a parking lot located at the center of the city, the user is encouraged to drive his/her vehicle to the designated parking lot located at the center of the city and park the vehicle in the designated parking lot as short a time as possible without driving aimlessly around the downtown areas or the tourist attraction areas. For other related documents, Patent Literatures 2 to 5 can be given.

CITATION LIST

Patent Literature

Patent Literature 1: Japanese Unexamined Patent Application Publication No. 2005-258842
Patent Literature 2: Japanese Unexamined Patent Application Publication No. H06-052495
Patent Literature 3: Japanese Unexamined Patent Application Publication No. 2009-014536
Patent Literature 4: Japanese Unexamined Patent Application Publication No. 2014-206857
Patent Literature 5: Japanese Unexamined Patent Application Publication No. 2017-062692

SUMMARY OF INVENTION

Technical Problem

However, in a parking lot management system described in Patent Literature 1, the locations of issuance of electronic numbered tickets are fixed at peripheral parking lots, so the users need to go to these peripheral parking lots and obtain their electronic numbered tickets, which is troublesome. Also, traffic congestion may occur due to a large number of vehicles driving over to these peripheral parking lots to obtain their electronic numbered tickets.

An object of the present disclosure is to provide a parking management apparatus, a parking management system, a parking management method, and a program each adapted to control traffic congestion near parking lots and perform management of parking lots more efficiently.

Solution to Problem

According to a first aspect of the present disclosure, a parking management apparatus includes: a parking-lot-inside-state measurement unit configured to measure a congestion state inside a parking lot; a determining unit configured to determine a location of issuance of an electronic numbered ticket for the parking lot based on the congestion state inside the parking lot that has been measured by the parking-lot-inside-state measurement unit; and an issuing unit configured to issue the electronic numbered ticket when the vehicle reaches a location in a neighborhood of the location of issuance of the electronic numbered ticket determined by the determining unit.

According to a second aspect of the present disclosure, a parking management system includes:
 a parking-lot-inside-state measurement unit configured to measure a congestion state inside a parking lot;
 a determining unit configured to determine a location of issuance of an electronic numbered ticket for the parking lot based on the congestion state inside the parking lot that has been measured by the parking-lot-inside-state measurement unit; and
 an issuing unit configured to issue the electronic numbered ticket when the vehicle reaches a location in a neighborhood of the location of issuance of the electronic numbered ticket determined by the determining unit.

According to a third aspect of the present disclosure, a parking management method includes:
 measuring a congestion state inside a parking lot;
 determining a location of issuance of an electronic numbered ticket for the parking lot based on the congestion state inside the parking lot that has been measured; and
 issuing the electronic numbered ticket when the vehicle reaches a location in a neighborhood of the location of issuance of the electronic numbered ticket that has been determined.

According to a fourth aspect of the present disclosure, a storage medium (a non-transitory computer-readable medium) stores a program for causing a computer to execute processing of:
 measuring a congestion state inside a parking lot;
 determining a location of issuance of an electronic numbered ticket for the parking lot based on the congestion state inside the parking lot that has been measured; and
 issuing the electronic numbered ticket when the vehicle reaches a location in a neighborhood of the location of issuance of the electronic numbered ticket that has been determined.

Advantageous Effects of Invention

According to the present disclosure, a parking management apparatus, a parking management system, a parking management method, and a program each adapted to control traffic congestion near parking lots and perform management of parking lots more efficiently can be provided.

EXAMPLE EMBODIMENT

First Example Embodiment

Example embodiments of the present disclosure will be described below with reference to the drawings.

Figure 1:
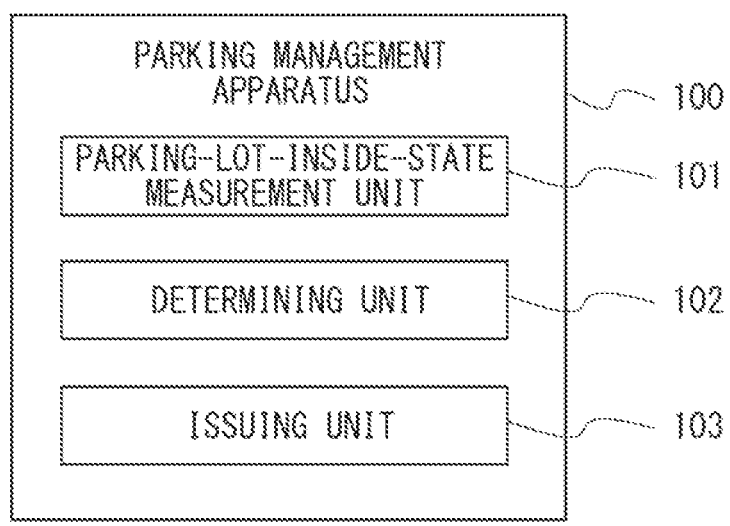
FIG. 1 is a block diagram showing a configuration of a parking management apparatus according to a first example embodiment.

FIG. 1 is a block diagram showing a configuration of a parking management apparatus according to a first example embodiment. A parking management apparatus 100 can be used to efficiently issue an electronic numbered ticket to a user to be using a parking lot. The parking management apparatus 100 can be realized by a computer equipped with a processor, a memory, etc. The parking management apparatus 100 includes a parking-lot-inside-state measurement unit 101, a determining unit 102, and an issuing unit 103.

The parking-lot-inside-state measurement unit 101 measures a congestion state inside parking lots. A congestion state is information indicating occupancy rates, availability information, etc. of parking lots. The parking-lot-inside-state measurement unit 101 acquires availability information (or occupancy information) of parking lots in, for example, the downtown area or the tourist attraction areas. The parking-lot-inside-state measurement unit 101 can acquire availability information (or occupancy information) of parking lots based on images captured by cameras. The parking-lot-inside-state measurement unit 101 may also acquire availability information (or occupancy information) of parking lots in conjunction with the operation of an openable-closable gate disposed at the respective parking lots. Furthermore, the parking-lot-inside-state measurement unit 101 may acquire availability information (or occupancy information) of parking lots in conjunction with the operation of various sensors (e.g., a sensor mounted on a flap plate). The examples given above are mere illustrative examples, and availability information (or occupancy information) may be acquired by any other suitable methods.

The determining unit 102 determines the location of issuance of an electronic numbered ticket for a parking lot based on the congestion state inside the parking lot that has been measured by the parking-lot-inside-state measurement unit 101. The location referred to herein may be a predetermined region or may be a location where a below-described sensor used when performing issuance of an electronic numbered ticket (e.g., an image capturing unit adapted to capture images of the location) is installed. A predetermined region may also be a virtual geographical boundary (called a geofence) in a location-information-based scheme.

The determining unit 102 can dynamically change the locations of issuance of an electronic numbered ticket based on the congestion state inside a parking lot, rather than setting a permanent location. Specifically, in some of the example embodiments, the higher the degree of congestion inside a parking lot of the destination is, the location of issuance of an electronic numbered ticket for the parking lot can be determined to be at a location from where the traveling time of the vehicle to reach the parking lot is longer. In this case, the traveling time for a vehicle to reach a parking lot of the destination may be predefined for each route based on the road width, the number of traffic lights, the average traffic volume by time of day, the speed limit on roads, other traffic rules, etc. In some of the example embodiments, the higher the degree of congestion inside a parking lot of the destination is, the determining unit 102 can determine the location of issuance of an electronic numbered ticket for the parking lot to be at a location farther distant from the parking lot. This is to prevent vehicles from causing traffic congestion near a parking lot of the destination due to the vehicles staying in the vicinity of the parking lot of the destination to wait for their turn to enter the parking lot.

In the case where it is judged that one or more vehicles that is applying for a parking space has reached the neighborhood of the location that has been determined by the determining unit 102, the issuing unit 103 subsequentially issues electronic numbered tickets to the terminals located inside the vehicles. In a positioning system, the location information of a vehicle or the location information of a mobile terminal located inside a vehicle is acquired, and based on the acquired information, it is possible to judge that the vehicle has reached the location of issuance of the electronic numbered ticket determined by the determining unit 102. Alternatively, in the case where an image capturing unit such as a camera is installed at various locations in the present system, the issuing unit 103 can identify a vehicle based on the image of the vehicle captured by the image capturing unit and issue an electronic numbered ticket to a vehicle-side terminal of the identified vehicle. In some of the example embodiments, the issuing unit 103 can identify a vehicle number from the number plate of a vehicle in the captured images using an image recognition technique and issue an electronic numbered ticket for the identified vehicle. The image capturing unit is realized by an illumination unit such as a white LED, an imaging optical system including an imaging lens, and an image pick-up device (CMOS (Complementary Metal Oxide Semiconductor) imager, a CCD (charge-coupled device), or the like.), and is configured to illuminate the surrounding of the vehicle with a white LED or the like to capture an image of the vehicle and its surrounding.

Terminals located inside vehicles include terminals installed in vehicles or mobile terminals located inside vehicles (for example, mobile terminals held by vehicle occupants including drivers of the vehicles). Terminals are information processing devices such as on-board computers. Mobile terminals can be any suitable portable information processing devices such as smartphones, tablets, lap-top personal computers, smartwatches, etc.

Figure 2:
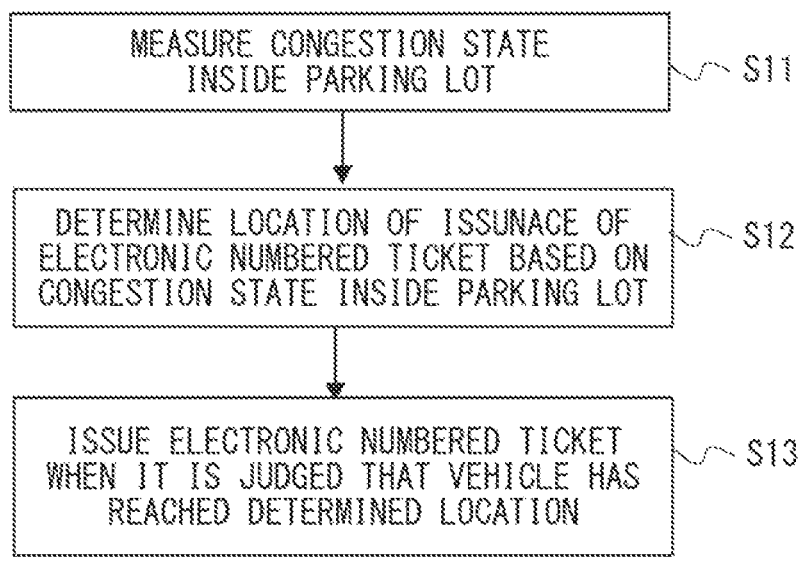
FIG. 2 is a flowchart showing a parking management method according to the first example embodiment.

FIG. 2 is a flowchart showing a parking management method according to the first example embodiment.

The parking-lot-inside-state measurement unit 101 measures the congestion state inside a parking lot (Step S11). Based on the congestion state inside the parking lot that has been measured by the parking-lot-inside-state measurement unit 101, the determining unit 102 determines the location of issuance of an electronic numbered ticket for the parking lot (Step S12). The issuing unit 103 issues an electronic numbered ticket in the case where it is judged that a vehicle has reached the neighborhood of the location that has been determined by the determining unit 102 (Step S13).

According to the first example embodiment described above, the location of issuance of an electronic numbered ticket for a parking lot can be changed depending on the congestion state inside the parking lot at the destination, and accordingly it is possible to have vehicles effectively parked in the parking lots at the respective destinations, thereby reducing traffic congestion in the vicinity of the parking lots at the respective destinations.

Second Example Embodiment

Figure 3:
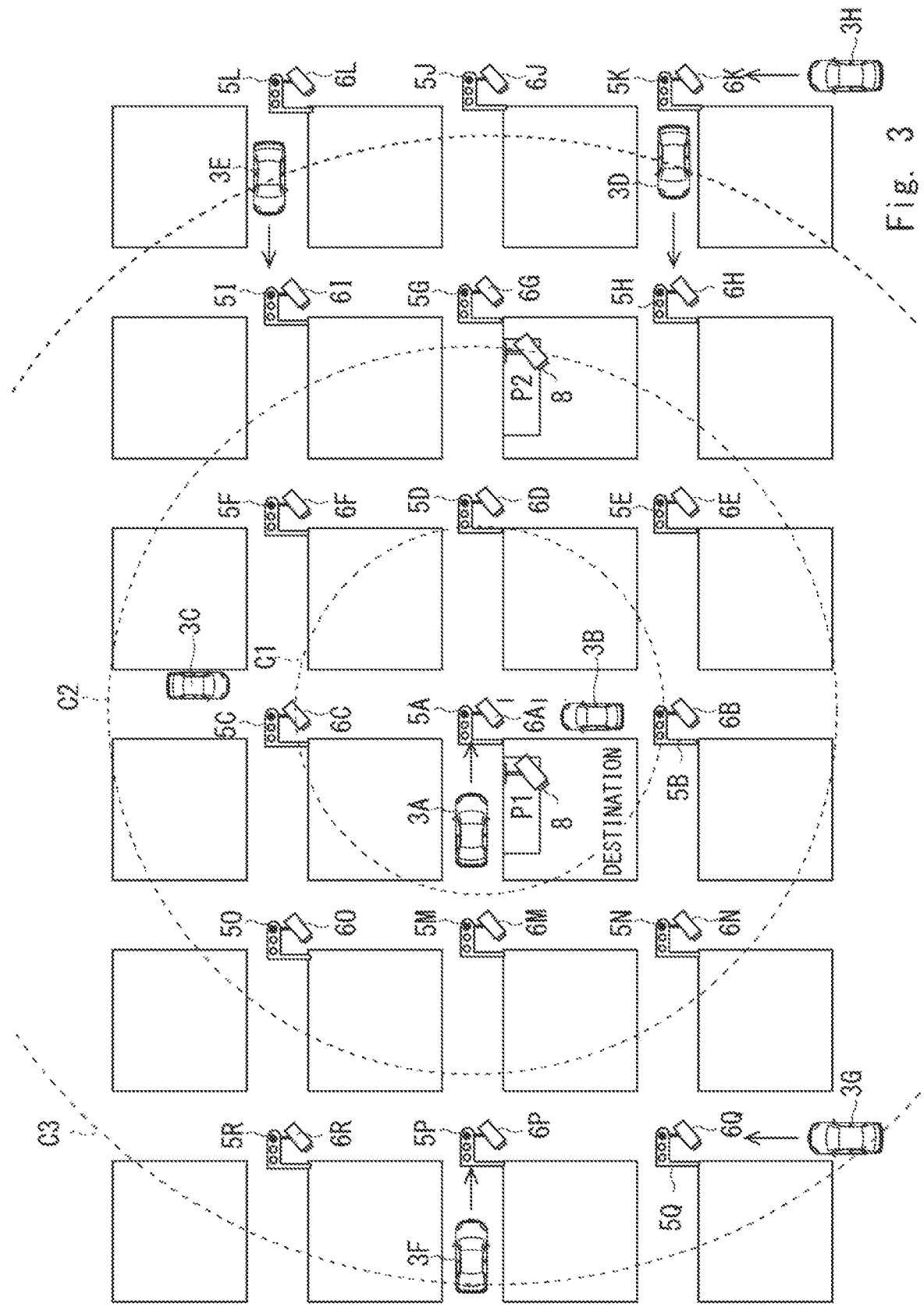
FIG. 3 is a diagram illustrating an example of an overall configuration of a parking management system according to a second example embodiment.

FIG. 3 is a diagram illustrating an example configuration of a parking management system 1 according to a second example embodiment.

A user driving vehicle is navigated to a registered destination using an app installed on a mobile terminal such as a smartphone or on a navigation system installed in a vehicle. A destination is a specific facility in areas such as the downtown area or the tourist areas. In FIG. 3, a facility (destination) has its parking lot P1 adjacent to it. Further, there is a parking lot P2 distant from the destination. Each parking lot is equipped with an image capturing unit 8, and the users can monitor the state of use of the parking lot (the occupancy rate, the congestion state, the availability state, etc.).

A traffic light 5 is located at each intersection in the downtown area. Each traffic light 5 has a signal light-side terminal (a signal light-side terminal 50 in FIG. 4) equipped with a camera (or various sensors), a 5G (5th Generation mobile communication system) base station, a processor, and a memory. A signal light-side terminal is realized by a computer. A signal light-side terminal enables relay between traffic lights and can perform communication with vehicles or mobile terminals via a 5G network. Further, signal light-side terminal can also collect surrounding information (for example, the traffic congestion state) using cameras (or various sensors). Surrounding information includes information about vehicles on roads, pedestrians, etc. The 5G base station is mentioned as an example of a base station, but the base station may be an LTE (Long Term Evolution) base station or a base station of the 6th generation mobile communication system or a higher version.

Figure 4:
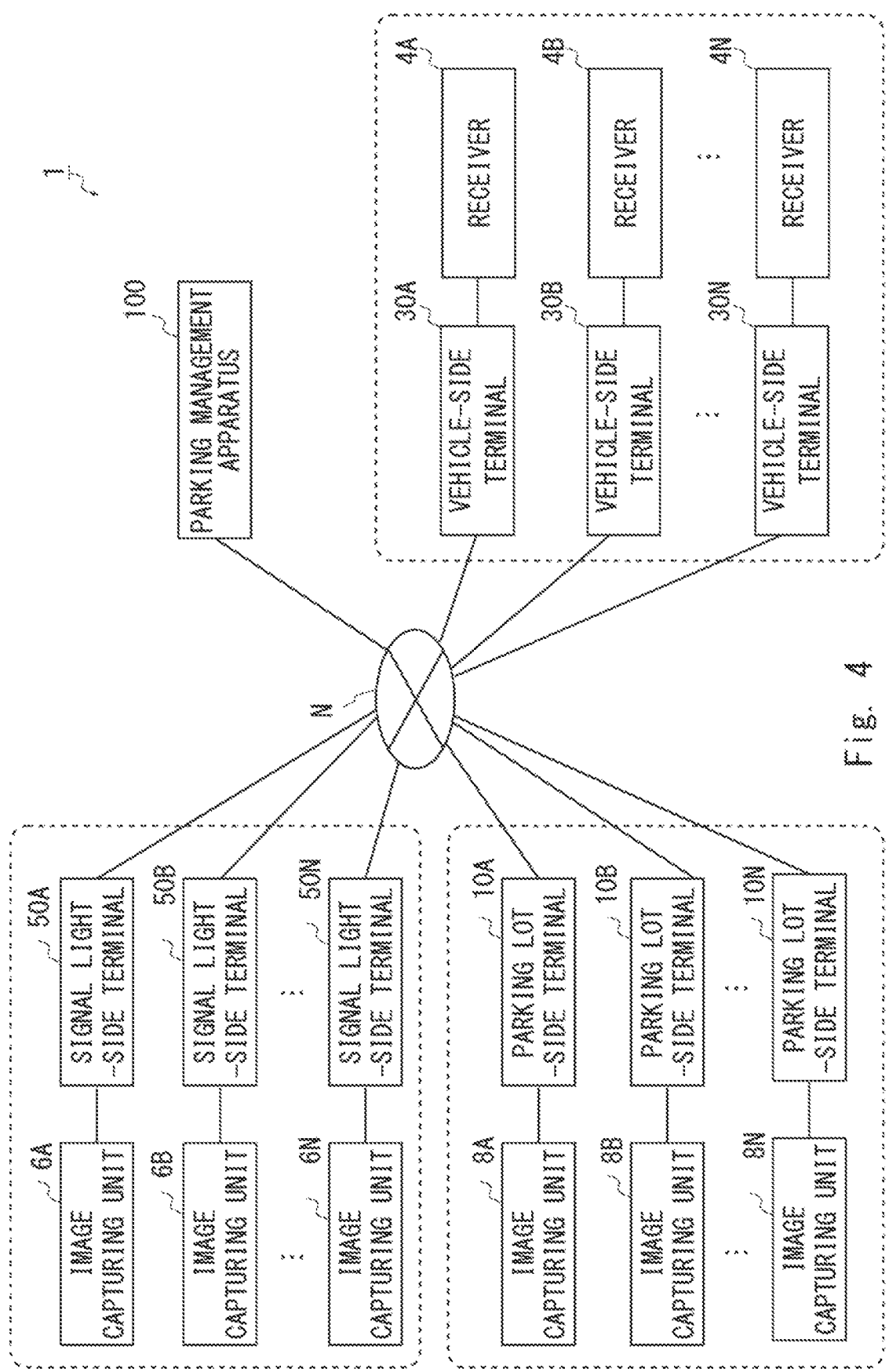
FIG. 4 is a block diagram showing a configuration of a parking management system according to the second example embodiment.

FIG. 4 is a block diagram showing a configuration of the parking management system according to the second example embodiment.

The parking management apparatus 100 is connected to each of the vehicle-side terminals 30A, 30B . . . 30N via a cabled or wireless network. The parking management apparatus 100 is also connected to each of the signal light-side terminals 50A, 50B . . . 50N and to each of the image capturing units 6A, 6B . . . 6N connected to the respective signal light-side terminals via a cabled or wireless network. The parking management apparatus 100 is connected to each of the parking lot-side terminals 10A, 10B . . . 10N and each of the image capturing units 8A, 8B . . . 8N via a cabled or wireless networks. The parking lot-side terminal 10 is a computer installed in each parking lot and is communicatively connected to the parking management apparatus 100.

It should be noted that the vehicle-side terminal 30 can be realized by a computer. The vehicle-side terminal 30 may include a receiver 4 for receiving signals (e.g., GPS signals) from a positioning system such as GPS (Global Positioning System).

Figure 5:
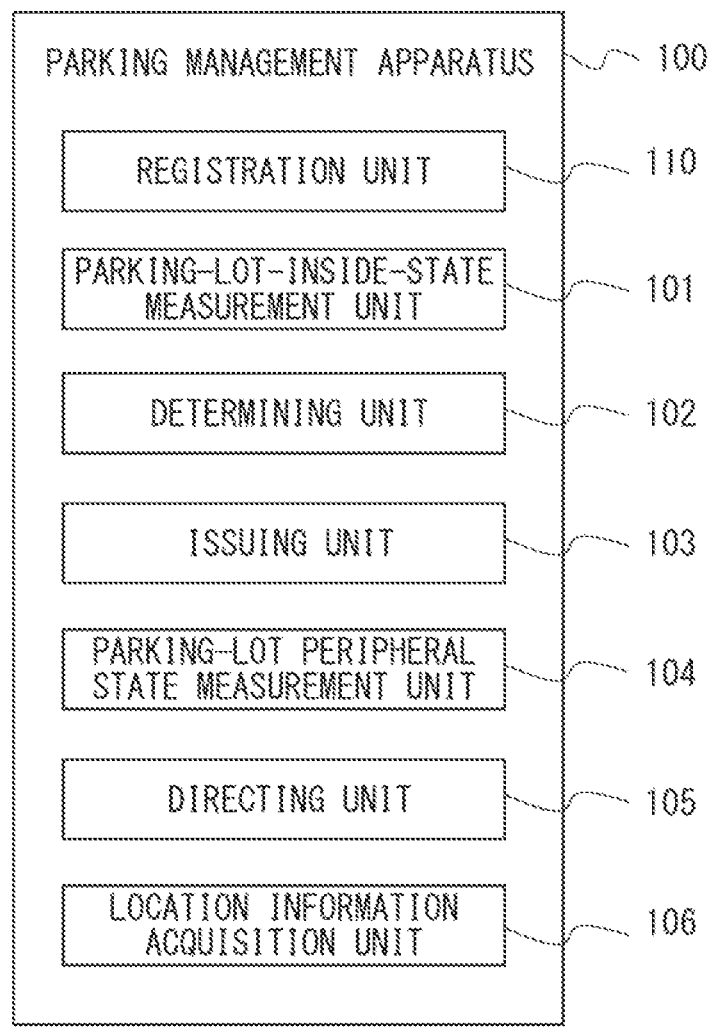
FIG. 5 is a block diagram showing a configuration of the parking management apparatus according to the second example embodiment.

FIG. 5 is a block diagram showing a configuration of the parking management apparatus according to the second example embodiment.

The parking management apparatus 100 can be a server computer with a processor and a memory installed therein. Specifically, as shown in FIG. 5, the parking management apparatus 100 includes a registration unit 110, the parking-lot-inside-state measurement unit 101, the determining unit 102, the issuing unit 103, a parking-lot peripheral state measurement unit 104, and a directing unit 105.

The registration unit 110 registers the personal identification information of users who are to use this service. For example, when a user is using this service, an identification number for identifying the user's vehicle, the user's portable terminal, or the like (e.g., a license plate, personal identification information) and personal information (e.g., name, age, and gender) of the user can be registered. A user can register these pieces of information by inputting the information via a mobile terminal, etc. The registered information can be stored inside a parking management apparatus or in a storage unit connected thereto.

The parking-lot-inside-state measurement unit 101 measures the congestion state inside a parking lot. Congestion state refers to information indicating an occupancy rate, availability information, etc. of a parking lot. The parking-lot-inside-state measurement unit 101 acquires availability information (or occupancy information) of a parking lot in, for example, the downtown areas or the tourist attraction areas. The parking-lot-inside-state measurement unit 101 can acquire availability information (or occupancy information) of a parking lot based on the images captured by cameras. The parking-lot-inside-state measurement unit 101 may also acquire availability information (or occupancy information) of a parking lot in conjunction with an openable-closable gate disposed at the parking lot. Furthermore, the parking-lot-inside-state measurement unit 101 may acquire availability information (or occupancy information) of a parking lot in conjunction with the operation of various sensors (e.g., a camera). The examples given above are mere illustrative examples, and availability information (or occupancy information) may be any other suitable methods.

The determining unit 102 determines the location of issuance of an electronic numbered ticket for a parking lot, i.e., in this example embodiment, the location where a traffic light is installed, based on the congestion state inside the parking lot that has been measured by the parking-lot-inside-state measurement unit 101. As described above, in the downtown area, a number of the traffic lights 5 (5A to 5R) are installed at respective intersections, and of these traffic lights, the one to be used when performing issuance of an electronic numbered ticket for the parking lot is determined.

In this example embodiment, the higher the degree of congestion inside a parking lot of the destination is, the determining unit 102 can determine the location of issuance of an electronic numbered ticket for the parking lot to be at a location where the traffic light 5 farther distant from the parking lot P1 of the destination is installed. The concentric regions C1, C2 and C3 indicated by the dotted lines in FIG. 3 indicate the locations of issuance of an electronic numbered ticket according to the degree of congestion inside the parking lot. In FIG. 3, the regions C1, C2 and C3 are indicated by concentric circles centered on the traffic light 5A near the parking lot P1, with the radii thereof getting larger sequentially. For example, in the case where the congestion state inside the parking lot P1 is below a threshold value (for example, an occupancy rate of 30%), then the traffic lights 5B, 5C, 5D, 5E, 5F, 5M, 5N and 5O outside of the circled region C1 having a small radius are determined to be used when performing issuance of an electronic numbered ticket for the parking lot P1. Also, in the case where, for example, the congestion state inside the parking lot P1 is equal to or above a threshold value (for example, an occupancy rate of 30% or higher to less than 70%), then traffic lights 5G, 5H, 5I, 5P, 5Q, and 5R outside of the circled region C2 having a medium radius are determined to be used when performing issuance of an electronic numbered ticket for the parking lot P1. Furthermore, in the case where, for example, the congestion state inside the parking lot P1 is equal to or above a threshold value (for example, an occupancy rate of 70%), the traffic lights 5J, 5K, and 5L outside of the circled region C3 having a large radius are determined to be used when performing issuance of an electronic numbered ticket for the parking lot P1.

The above example embodiment is merely an illustration and the traffic light to be used when performing issuance of an electronic numbered ticket for a parking lot can be determined in various ways. While in the above example concentric regions having various radii centered on the traffic light 5A near the parking lot of the destination are defined, it is not limited thereto, and for example, regions having various other shapes and sizes such as a rectangular region, an elliptical region, and a diamond-shaped region each centered on the location of the target parking lot may be defined. Further, in another example embodiment, it may be possible to make a pre-setting so that the higher the congestion state inside a parking lot is, the traffic light farther distant from the location of the parking lot may be used when performing issuance of an electronic numbered ticket for the parking lot.

In another example embodiment, a location from where the traveling time of the vehicle to reach the parking lot at the destination in a straight-line distance is long may be determined as the location of issuance of an electronic numbered ticket. In this case, the route from the location of issuance of an electronic ticket to the parking lot may be taken into account when determining the location of issuance an electronic numbered ticket, and information such as the degree of traffic congestion and the amount of traffic on the route may additionally be used when determining the location of issuance of the electronic numbered ticket. Further, in another example embodiment, the traffic congestion state on the route to the parking lot may be measured by the parking-lot peripheral state measurement unit 104, and the location of issuance of an electronic ticket may be determined dynamically by taking into consideration the measurement results. Specifically, in the case where the route to the parking lot is highly congested, it could be judged that it would take a longer time to reach the parking lot.

When a vehicle registered in the registration unit 110 reaches a location in the neighborhood of the traffic light as determined by the determining unit 102, the issuing unit 103 issues an electronic numbered ticket to a terminal located inside the vehicle 3. For example, in the case where the congestion state inside the parking lot P1 is below a threshold value (for example, an occupancy rate of 30%), the traffic light 5C outside of the circled region C1 having a small radius issues an electronic numbered ticket. Thus, the traffic light 5C can issue an electronic numbered ticket to a terminal (for example, an on-board computer or a smartphone) in the vehicle 3C when the image capturing unit 6C of the traffic light 5C captures an image of the vehicle 3C heading for the parking lot P1 at the destination. In another example, for example, in the case where the congestion state inside the parking lot P1 is equal to or below a threshold value (for example, an occupancy rate of from 30% or higher to less than 70%), the traffic light 5H outside of the circled region C2 having a medium radius issues an electronic numbered ticket. Thus, the traffic light 5H can issue an electronic numbered ticket to a terminal (for example, an on-board computer or a smartphone) in the vehicle 3D when the image capturing unit 6H of the traffic light 5H captures an image of the vehicle 3D heading for the parking lot P1 at the destination. In yet another example, for example, in the case where the congestion state inside the parking lot P1 is above the threshold (for example, an occupancy rate of 70%), the traffic light 5K outside of the circled region C3 with a large radius serves as the subject for which an electronic numbered ticket for the concerned parking lot is issued. Thus, traffic light 5K can issue an electronic numbered ticket to a terminal (for example, an on-board computer or a smartphone) in vehicle 3H when the image capturing unit 6K of the traffic light 5K captures an image of the vehicle 3H heading for the parking lot P1 at the destination.

As described above, the issuing unit 103 can identify the vehicle license plate using the image recognition technique and issue an electronic numbered ticket to a terminal located inside the identified vehicle terminal and a mobile terminal associated with the identified vehicle. By issuing an electronic numbered ticket using captured images of a vehicle, it is possible to identify the vehicle more precisely and accurately and then issue an electronic numbered ticket than in the case where location information obtained by GPS, or the like is used.

In the example described above, an electronic numbered ticket is issued for each of the vehicles outside of the regions (C1, C2, C3) when the respective vehicles pass by the traffic light just outside of the region in question. That is, it is possible to configure the system in such a way that electronic numbered tickets are not issued for vehicles that are present within the regions. By this configuration, it is possible to reduce congestion caused by vehicles present within the regions.

The parking-lot peripheral state measurement unit 104 measures the traffic congestion state in a given area in the vicinity of the parking lot P1. For example, in the example shown in FIG. 3, the image capturing unit 6A of the traffic light 5A, the image capturing unit 6B of the traffic light 5B, the image capturing unit 6C of the traffic light 5C, the image capturing unit 6D of the traffic light 5D, the image capturing unit 6E of the traffic light 5E, the image capturing unit 6F of the traffic light 5F, the image capturing unit 6M of the traffic light 5M, the image capturing unit 6N of the traffic light 5N, and the image capturing unit 6O of the traffic light 5O can be used as the parking-lot peripheral state measurement unit 104. Based on the images captured by the aforementioned image capturing units, the traffic congestion state in a given area in the vicinity of the parking lot P1 can be measured.

In the case where the congestion state inside the parking lot P1 is higher than the norm and the traffic congestion state in a given area (for example, the road within the region C1) is higher than the norm, the directing unit 105 will direct the vehicle to another parking lot P2 that is located closer to the vehicle than the parking lot P1 is when the vehicle reaches the location of issuance of the electronic numbered ticket determined by the determining unit 102 (the traffic light 5K, for example). In some of the example embodiments, in the case where the congestion state inside the parking lot P1 is equal to or above a threshold value (for example, an occupancy rate of 90%) and in the case where the traffic congestion state in a given area (for example, the road within the region C1) is higher than the norm, the vehicle may be directed to another parking lot P2 without an electronic numbered ticket for the parking lot P1 being issued. In the another example embodiment, in the case where the congestion state inside parking lot P1 is equal to or above a threshold (for example, an occupancy rate of 90%) and in the case where the traffic congestion state in a given area (for example, the road within the region C1) is higher than the norm, an electronic numbered ticket for the parking lot P1 may be issued and the location of another parking lot P2 may be presented to the user to allow the user to select between the two parking lots. If the user selects the another parking lot P2, the navigation system may guide the vehicle to the parking lot P2. It should be noted that the directing unit 105 can perform vehicle navigation using the map information and the location information of the following vehicle.

A location information acquisition unit 106 acquires the location information of a vehicle of a mobile terminal located inside the vehicle using various positioning systems.

In some of the example embodiments, all or a part of the functions of the parking management apparatus 100 may be included in the functions of the signal light-side terminal 50, the vehicle-side terminal 30, or the parking lot-side terminal 10. Further, a parking lot may also have separate entry points for a vehicle to which electronic numbered ticket has been issued, and for a vehicle to which an electronic numbered ticket has not been issued. The functions of the parking management apparatus 100 may be provided in SaaS (software-as-a-service) format.

Figure 6:
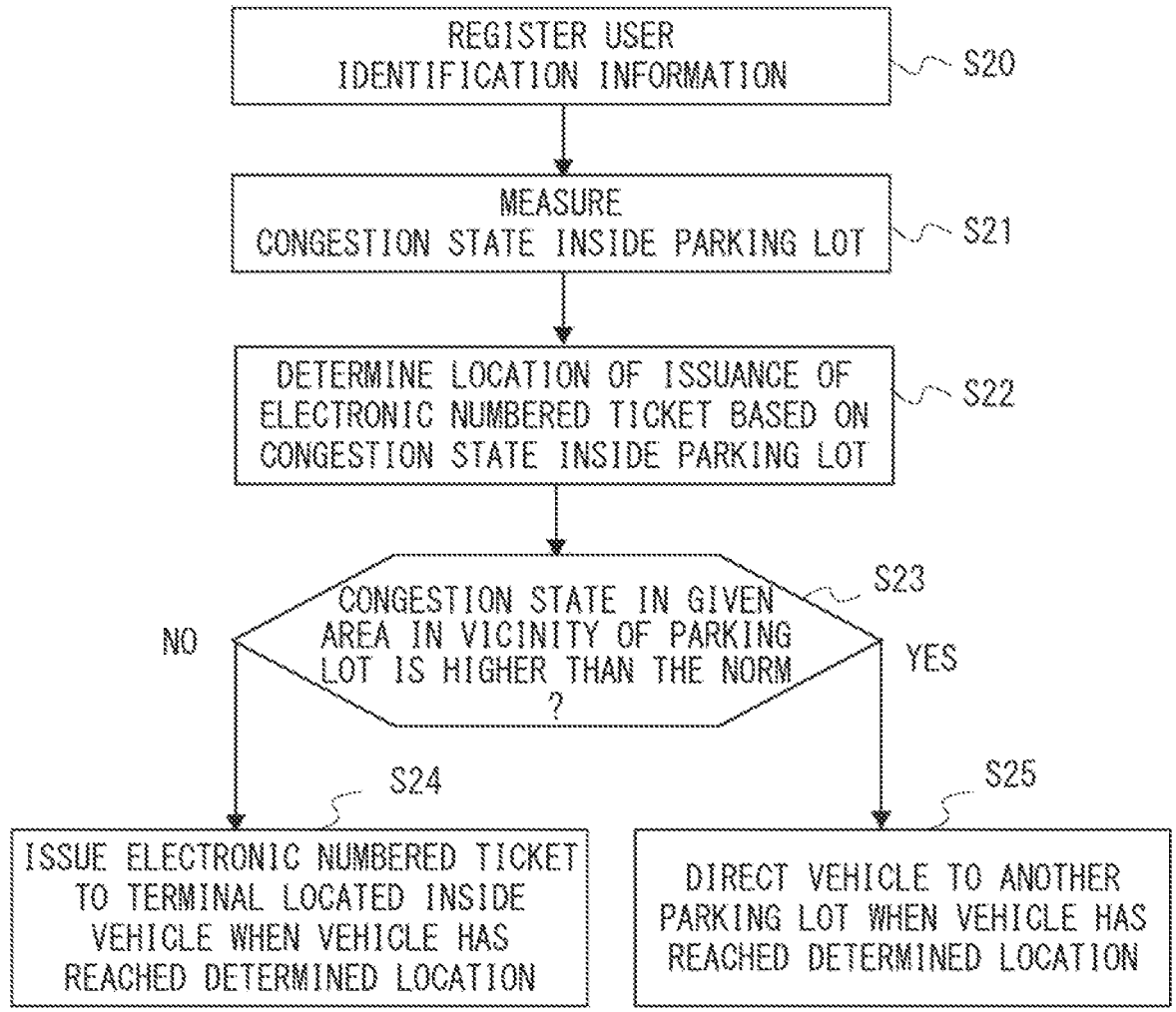
FIG. 6 is a flowchart showing a parking management method according to the second example embodiment.

FIG. 6 is a flowchart showing a parking management method according to the second example embodiment.

The registration unit 110 registers user identification information (for example, a vehicle number and other personal information) in a storage unit (Step S20). The parking-lot-inside-state measurement unit 101 measures the congestion state inside a parking lot (Step S21). The determining unit 102 determines the location of issuance of an electronic numbered ticket for a parking lot based on the congestion state inside the parking lot that has been measured by the parking-lot-inside-state measurement unit 101 (Step S22). The issuing unit 103 issues an electronic numbered ticket to a terminal located inside the vehicle in the case where it is judged that vehicle has reached a location in the neighborhood of the location of issuance of the electronic numbered ticket that has been determined by the determining unit 102 (Step S23). The parking-lot peripheral state measurement unit 104 measures the traffic congestion state in a given area in the vicinity of the parking lot P1 and judges whether the traffic congestion state is higher than the norm (Step S23). In the case where the traffic congestion state in a given area in the vicinity of the parking lot is measured and it is no more congested than the norm (NO in Step S23), then as described above, an electronic numbered ticket is issued and notified to the terminal located inside the vehicle (Step S24). On the other hand, in the case where the traffic congestion state in a given area is measured and it is higher than the norm (YES in Step S23), the vehicle can be directed to another parking lot P2 which is located closer to the vehicle than the parking lot P1 is (Step S25).

According to second example embodiment described above, the location of issuance of an electronic numbered ticket for a parking lot can be changed depending on the congestion state inside the parking lot at the destination. Furthermore, in the case where the area near the parking lot of the destination is congested, the vehicle can be directed to a parking lot that is different from the parking lot of the destination, which is located closer to the vehicle than the parking lot of the destination is. This will reduce traffic congestion near the parking lot of the destination and parking management can be performed more efficiently.

Note that in some of the example embodiments, the vehicle parking fee may be incurred from the instant an electronic numbered ticket is issued. Due this configuration, a user will drive his/her vehicle from the location of issuance of an electronic numbered ticket (for example, a traffic light) straight to the parking lot of the destination without stopping anywhere along the way, thereby reducing traffic congestion in the vicinity of the parking lot. On the contrary, users will be free to take a side trip while heading for their respective destinations until the timing when any electronic numbered tickets are issued.

In further another example embodiment, the traffic congestion state of the area in the vicinity of the another parking lot P2 may be measured by the parking-lot peripheral state measurement unit 104 and the vehicle may be directed to the another parking lot where there is no occurrence of traffic congestion in the vicinity of the parking lot.

It should be noted that in addition to the configuration in which a camera and a base station are mounted on a traffic light, for example, a camera and a base station may be mounted on structures such as streetlights or utility poles installed on or near roads.

Figure 7:
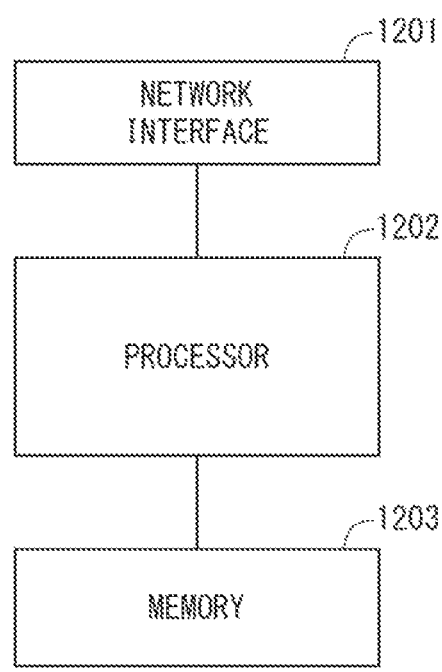
FIG. 7 is a block diagram illustrating a configuration example of hardware such as a parking management apparatus 100.

FIG. 7 is a block diagram illustrating a configuration example of hardware such as the parking management apparatus 100, the parking lot-side terminal 10, the vehicle-side terminal 30, and the signal light-side terminal 50 (hereinafter referred to as the parking management apparatus 100, etc.). Referring to FIG. 7, the parking management apparatus 100, etc., includes a network interface 1201, a processor 1202, and a memory 1203. The network interface 1201 is used to communicate with other network node devices constituting the communication system. The network interface 1201 may be used to perform wireless communication. For example, the network interface 1201 may be used to perform wireless LAN communication as specified in the IEEE 802.11 series or mobile communication as specified in the 3GPP (3rd Generation Partnership Project). Alternatively, the network interface 1201 may include, for example, a network interface card (NIC) that conforms to the IEEE 802.3 series.

The processor 1202 reads software (computer programs) from the memory 1203 and executes them to perform processing of the parking management apparatus 100 and the like described in the above example embodiments using flowcharts or sequences. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a nonvolatile memory. The memory 1203 may include a storage disposed separately from the processor 1202. In this case, the processor 1202 may access the memory 1203 through an I/O interface, which is not shown.

In the example shown in FIG. 7, the memory 1203 is used to store software modules. By reading these software modules from the memory 1203 and executing them, the processor 1202 can perform the processing of the parking management apparatus 100 described above in the example embodiments.

As described by referring to FIG. 2 or FIG. 5, each of the processors that are included in the parking management apparatus 100 executes one or more programs containing a set of instructions to cause a computer to perform the algorithm described above by referring to the figures.

In the above-described examples, the programs can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives), optical magnetic storage media (e.g. magneto-optical disks), CD-ROM (Read Only Memory), CD-R, CD-R/W, semiconductor memories (e.g. mask ROM, PROM (Programmable ROM), EPROM (Erasable PROM), flash ROM, and RAM (Random Access Memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line such as electric wires and optical fibers or a wireless communication line.

The present disclosure is not limited to the above-mentioned example embodiments and can be changed as appropriate without departing from the gist of the present disclosure. The several examples described above may also be combined as appropriate.

Some or all of the above example embodiments may also be described as in the following supplementary notes, but they are not to be limited thereto.

(Supplementary Note 1)

A parking management apparatus comprising:
- a parking-lot-inside-state measurement unit configured to measure a congestion state inside a parking lot;
- a determining unit configured to determine a location of issuance of an electronic numbered ticket for the parking lot based on the congestion state inside the parking lot that has been measured by the parking-lot-inside-state measurement unit; and
- an issuing unit configured to issue the electronic numbered ticket when it is judged that the vehicle has reached a location in a neighborhood of the location of issuance of the electronic numbered ticket determined by the determining unit.

(Supplementary Note 2)

The parking management apparatus described in Supplementary Note 1, wherein the higher the degree of congestion state inside the parking lot that has been measured by the parking-lot-inside-state measurement unit is, the determining unit determines the location of issuance of the electronic numbered ticket for the parking lot to be at a location from where a traveling time of the vehicle to reach the parking lot is longer or at a location distant from the parking lot.

(Supplementary Note 3)

The parking management apparatus described in Supplementary Note 1 or 2, further comprising:
- a parking-lot peripheral state measurement unit configured to measure a traffic congestion state in a given area in a vicinity of the parking lot; and
- a directing unit configured to direct the vehicle to another parking lot that is located closer to the vehicle than the parking lot is in a case where the congestion state inside the parking lot is higher than the norm and the traffic congestion state inside the given area is higher than the norm, and in a case where it is judged that the vehicle has reached the location of issuance of the electronic numbered ticket determined by the determining unit.

(Supplementary Note 4)

The parking management apparatus described in any one of Supplementary Notes 1 to 3, wherein the issuing unit is configured to issue the electronic numbered ticket for the parking lot in a case where an image of the vehicle is captured by an image capturing unit adapted to capture an image of the location of issuance of the electronic numbered ticket determined by the determining unit.

(Supplementary Note 5)

The parking management apparatus described in any one of Supplementary Notes 1 to 4, wherein the issuing unit is configured to issue the electronic numbered ticket to a terminal installed in the vehicle or a terminal held by an occupant of the vehicle.

(Supplementary Note 6)

The parking management apparatus described in any one of Supplementary Notes 1 to 5, wherein the issuing unit is configured to issue an electronic numbered ticket for the parking lot in a case where it is judged that the vehicle has reached the location of issuance of the electronic numbered ticket determined by the determining unit based on location information of the vehicle.

(Supplementary Note 7)

The parking management apparatus described in Supplementary Note 3, wherein the parking-lot peripheral state measurement unit is configured to measure the traffic congestion state based on images captured by an image capturing unit attached to a traffic light.

(Supplementary Note 8)

The parking management apparatus described in any one of Supplementary Notes 1 to 7, further comprising a location information acquisition unit configured to acquire location information of a terminal located inside the vehicle.

(Supplementary Note 9)

A parking management system comprising:
- a parking-lot-inside-state measurement unit configured to measure a congestion state inside a parking lot;
- a determining unit configured to determine a location of issuance of an electronic numbered ticket for the parking lot based on the congestion state inside the parking lot that has been measured by the parking-lot-inside-state measurement unit; and
- an issuing unit configured to issue the electronic numbered ticket when it is judged that the vehicle has reached a location in a neighborhood of the location of issuance of the electronic numbered ticket determined by the determining unit.

(Supplementary Note 10)

The parking management system described in Supplementary Note 9, wherein the higher the degree of congestion state inside the parking lot that has been measured by the parking-lot-inside-state measurement unit is, the determining unit determines the location of issuance of the electronic numbered ticket for the parking lot to be at a location farther distant from the parking lot.

(Supplementary Note 11)

The parking management system described in Supplementary Note 9 or 10, further comprising:
- a parking-lot peripheral state measurement unit configured to measure a traffic congestion state in a given area in a vicinity of the parking lot; and
- a directing unit configured to direct the vehicle to another parking lot that is located closer to the vehicle than the parking lot is in a case where the congestion state inside the parking lot is higher than the norm and the traffic congestion state inside the given area is higher than the norm, and in a case where it is judged that the vehicle has reached the location of issuance of the electronic numbered ticket determined by the determining unit.

(Supplementary Note 12)

The parking management system described in any one of Supplementary Notes 9 to 11, wherein the issuing unit is configured to issue the electronic numbered ticket for the parking lot in a case where an image of the vehicle is captured by an image capturing unit adapted to capture an image of the location of issuance of the electronic numbered ticket determined by the determining unit.

(Supplementary Note 13)

The parking management system described in any one of Supplementary Notes 9 to 11, wherein the issuing unit is configured to issue the electronic numbered ticket to a terminal installed in the vehicle or a terminal held by a vehicle occupant of the vehicle.

(Supplementary Note 14)

The parking management system described in any one of Supplementary Notes 9 to 13, wherein the issuing unit is configured to issue an electronic numbered ticket for the parking lot in a case where it is judged that the vehicle has reached the location of issuance of the electronic numbered ticket determined by the determining unit based on location information of the vehicle.

(Supplementary Note 15)

The parking management system described in Supplementary Note 11, wherein the parking-lot peripheral state measurement unit is configured to measure a traffic congestion state based on images captured by an image capturing unit attached to a traffic light.

(Supplementary Note 16)

The parking management system described in any one of Supplementary Notes 9 to 15, further comprising a location information acquisition unit configured to acquire location information of a terminal located inside the vehicle.

(Supplementary Note 17)

A parking management method comprising:
measuring a congestion state inside a parking lot;
determining a location of issuance of an electronic numbered ticket for the parking lot based on the congestion state inside the parking lot that has been measured; and
issuing the electronic numbered ticket when it is judged that the vehicle has reached a location in a neighborhood of the location of issuance of the electronic numbered ticket that has been determined.

(Supplementary Note 18)

A non-transitory computer-readable medium storing a program for causing a computer to execute processing of:
measuring a congestion state inside a parking lot;
determining a location of issuance of an electronic numbered ticket for the parking lot based on the congestion state inside the parking lot that has been measured; and
issuing the electronic numbered ticket when it is judged that the vehicle has reached a location in a neighborhood of the location of issuance of the electronic numbered ticket that has been determined.

REFERENCE SIGNS LIST

1 PARKING MANAGEMENT SYSTEM
3 VEHICLE
4 RECEIVER
5 TRAFFIC LIGHT
6 IMAGE CAPTURING UNIT
8 IMAGE CAPTURING UNIT
10 PARKING LOT-SIDE TERMINAL
30 VEHICLE-SIDE TERMINAL
50 SIGNAL LIGHT-SIDE TERMINAL
100 PARKING MANAGEMENT APPARATUS
110 REGISTRATION UNIT
101 PARKING-LOT-INSIDE-STATE MEASUREMENT UNIT
102 DETERMINING UNIT
103 ISSUING UNIT
104 PARKING-LOT PERIPHERAL STATE MEASUREMENT UNIT
105 DIRECTING UNIT
106 LOCATION INFORMATION ACQUISITION UNIT
C1, C2, C3 CONCENTRIC REGION

What is claimed is:

1. A parking management apparatus comprising:
at least one memory storing instructions, and
at least one processor configured to execute the instructions to;
measure a congestion state inside a parking lot;
determine a location of issuance of an electronic numbered ticket for the parking lot based on the congestion state inside the parking lot that has been measured; and
issue the electronic numbered ticket when the vehicle reaches a location in a neighborhood of the location of issuance of the electronic numbered ticket determined.

2. The parking management apparatus according to claim 1, wherein, the at least one processor configured to execute the instructions to;
determine the location of issuance of the electronic numbered ticket for the parking lot to be at a location from where a traveling time of the vehicle to reach the parking lot is longer or at a location distant from the parking lot, the higher the degree of congestion state inside the parking lot that has been measured is.

3. The parking management apparatus according to claim 1, wherein the at least one processor configured to execute the instructions to
measure a traffic congestion state in a given area in a vicinity of the parking lot; and
direct the vehicle to another parking lot that is located closer to the vehicle than the parking lot is in a case where the congestion state inside the parking lot is higher than the norm and the traffic congestion state inside the given area is higher than the norm, and in a case where it is judged that the vehicle has reached the location of issuance of the electronic numbered ticket determined.

4. The parking management apparatus according to claim 1, wherein the at least one processor configured to execute the instructions to issue the electronic numbered ticket for the parking lot in a case where an image of the vehicle is captured by an image capturing unit adapted to capture an image of the location of issuance of the electronic numbered ticket determined.

5. The parking management apparatus according to claim 1, wherein the at least one processor configured to execute the instructions to issue the electronic numbered ticket to a terminal installed in the vehicle or a terminal held by an occupant of the vehicle.

6. The parking management apparatus according to claim 1, wherein the at least one processor configured to execute the instructions to issue an electronic numbered ticket for the parking lot in a case where it is judged that the vehicle has reached the location of issuance of the electronic numbered ticket determined by the determining unit based on location information of the vehicle.

7. The parking management apparatus according to claim 3, wherein the at least one processor configured to execute the instructions to measure the traffic congestion state based on images captured by an image capturing unit attached to a traffic light.

8. The parking management apparatus according to claim 1, wherein the at least one processor configured to execute the instructions to acquire location information of a terminal located inside the vehicle.

9. A parking management system comprising:

at least one memory storing instructions, and at least one processor configured to execute the instructions to;

measure a congestion state inside a parking lot;

determine a location of issuance of an electronic numbered ticket for the parking lot based on the congestion state inside the parking lot that has been measured; and issue the electronic numbered ticket when the vehicle reaches a location in a neighborhood of the location of issuance of the electronic numbered ticket determined.

10. The parking management system according to claim 9, wherein the higher the degree of congestion state inside the parking lot that has been measured is, the at least one processor configured to execute the instructions to determine the location of issuance of the electronic numbered ticket for the parking lot to be at a location farther distant from the parking lot.

11. The parking management system according to claim 9, wherein the at least one processor configured to execute the instructions to measure a traffic congestion state in a given area in a vicinity of the parking lot; and direct the vehicle to another parking lot that is located closer to the vehicle than the parking lot is in a case where the congestion state inside the parking lot is higher than the norm and the traffic congestion state inside the given area is higher than the norm, and in a case where it is judged that the vehicle has reached the location of issuance of the electronic numbered ticket determined.

12. The parking management system according to claim 9, wherein the at least one processor configured to execute the instructions to issue the electronic numbered ticket for the parking lot in a case where an image of the vehicle is captured by an image capturing unit adapted to capture an image of the location of issuance of the electronic numbered ticket determined.

13. The parking management system according to claim 9, wherein the at least one processor configured to execute the instructions to issue the electronic numbered ticket to a terminal installed in the vehicle or a terminal held by a vehicle occupant of the vehicle.

14. The parking management system according to claim 9, wherein the at least one processor configured to execute the instructions to issue an electronic numbered ticket for the parking lot in a case where it is judged that the vehicle has reached the location of issuance of the electronic numbered ticket determined based on location information of the vehicle.

15. The parking management system according to claim 11, wherein the at least one processor configured to execute the instructions to measure a traffic congestion state based on images captured by an image capturing unit attached to a traffic light.

16. The parking management system according to claim 9, wherein the at least one processor configured to execute the instructions to acquire location information of a terminal located inside the vehicle.

17. A parking management method comprising:

measuring a congestion state inside a parking lot;

determining a location of issuance of an electronic numbered ticket for the parking lot based on the congestion state inside the parking lot that has been measured; and issuing the electronic numbered ticket when the vehicle reaches a location in a neighborhood of the location of issuance of the electronic numbered ticket that has been determined.

18. A non-transitory computer-readable medium storing a program for causing a computer to execute processing the method according to claim 17.

* * * * *